Nov. 29, 1938. C. A. REIMSCHISSEL Re. 20,930
CHASER AND CHASER CLAMP
Original Filed Dec. 7, 1933
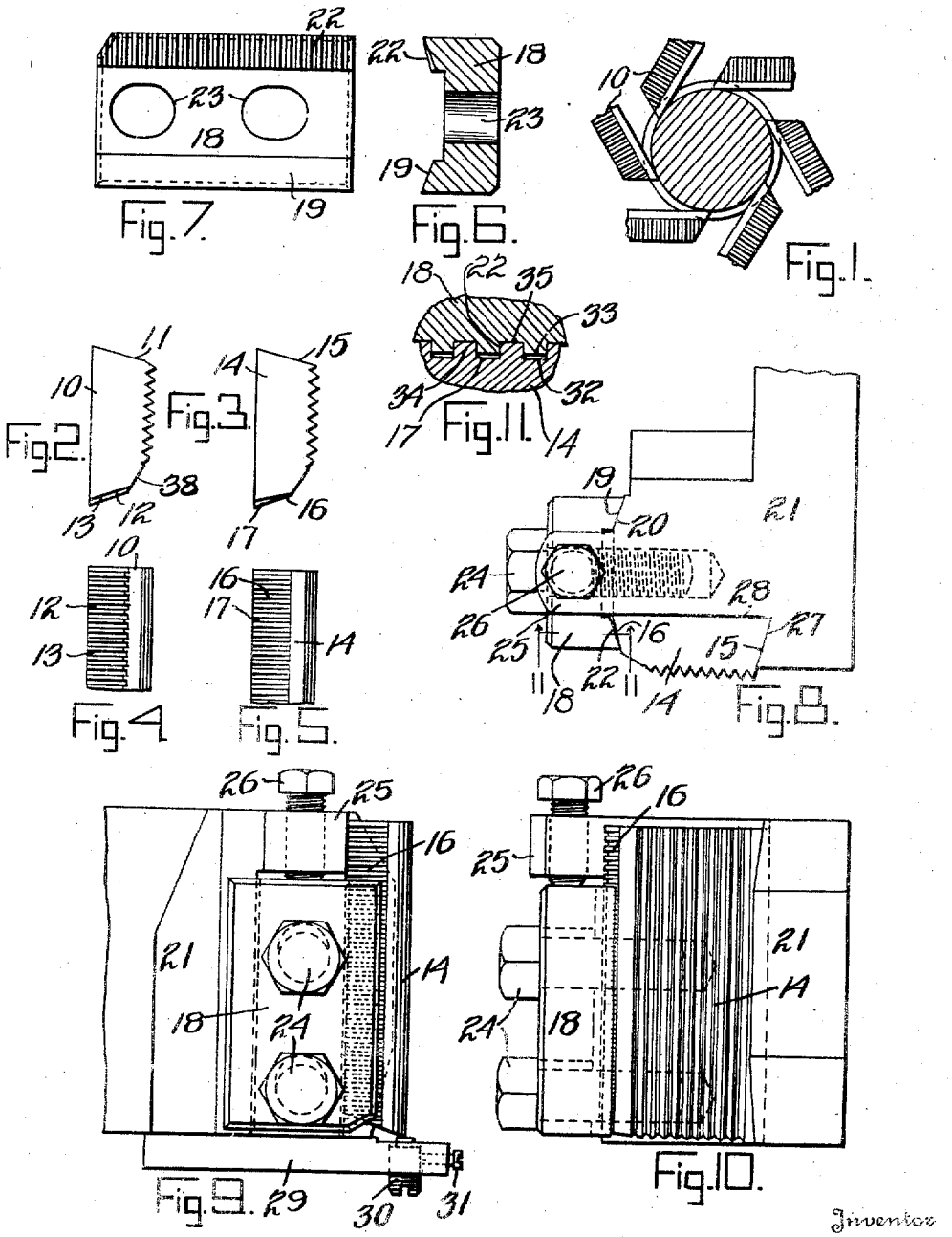
Inventor
Charles A. Reimschissel.
By Strauch & Hoffman
Attorneys Reissued Nov. 29, 1938

Re. 20,930

UNITED STATES PATENT OFFICE 20,930

CHASER AND CHASER CLAMP

Charles A. Reimschissel, Waynesboro, Pa., assignor to Landis Machine Company, Waynesboro, Pa., a corporation of Pennsylvania Original No. 2,023,440, dated December 10, 1935, Serial No. 701,366, December 7, 1933. Application for reissue December 4, 1937, Serial No. 178,188

24 Claims. (Cl. 10—104)

This invention relates to thread cutting chasers and holders and particularly to chasers of the tangential type. The object of the invention is to provide an improved tangential chaser and further to provide improved means for adjusting and locating the chaser in correct cutting position and for clamping it in a die head.

Further objects and advantages will become apparent from the description which follows.

Referring to the accompanying drawing, which is made a part hereof and on which similar reference characters indicate similar parts;

Figure 1 is a somewhat diagrammatic view illustrating the positions of chasers when in cutting relation with the work.

Figure 2, an end view of one form of chaser showing grooves for adjusting the chaser and securing it against longitudinal movement.

Figure 3, a view of a chaser showing a different form of groove.

Figures 4 and 5 are plan views of the chasers shown in Figures 2 and 3, respectively.

Figure 6 is an end view of a clamp having grooves, corresponding to those shown in Figures 3 and 5.

Figure 7 is a plan view of the under side of the clamp shown in Figure 6.

Figure 8 is an end view of a chaser and clamp positioned in a holder on a threading head.

Figure 9, a plan view of the chaser clamp and holder, shown in Figure 8.

Figure 10, a face view looking from the right of the arrangement shown in Figure 9, and Figure 11, a fragmentary sectional view, taken substantially on line 11—11 of Figure 8, showing the cooperating grooves on the clamp and chaser.

In the drawing numeral 10 indicates a thread cutting chaser of the tangential type having thread cutting serrations on its face, a throat or starting bevel 38, a beveled base 11, a beveled top 12 with parallel grooves 13 on the beveled top (Figures 2, 4). In Figures 3 and 5 the chaser 14 has a beveled base 15, cutting serrations on its face and a beveled top 16 and grooves 17, the bottoms of which grooves are at an angle to the tops of the grooves. The form of the chaser shown in Figures 3 and 5 is that shown in the combinations of the remaining figures in the drawing. A chaser clamp 18 has a beveled portion 19 adapted to seat on a corresponding beveled portion 20 on the holder block 21. The holder block may be any form of holder, that shown being a sliding holder mounted in an opening in a threading head. The clamp has beveled grooves 22 adapted to engage the grooves 17 in the top of the chaser 14. The grooves shown are the beveled kind but may be parallel grooves adapted to cooperate with the parallel grooves 13 of the chaser 10. The clamp is also provided with elongated holes 23 through which extend securing bolts 24, the bolts engaging in threaded holes in the block 21. The block 21 also is provided with a lug 25 through which an adjusting screw 26 is threaded to engage the end of the clamp for adjusting the clamp and for holding it in adjusted position. The block 21 has a seat 27 and a face portion 28 against which seat and face portion the beveled base 15 and back of the chaser rest when the chaser is held in operative position. At 29 is shown a setting gauge having an adjustable screw 30 for locating the cutting tips of the chaser. The screw 30 is held in adjustable position by means of screw 31.

When either the chaser 10 or 14 is placed in the holder 21 the beveled base of the chaser and the back seat respectively against surfaces 27 and 28 in the block. The clamp 18 is secured in position by means of the screws 24. The grooves 22 of the clamp engage in the grooves of the chaser and hold the chaser against endwise movement. A slight adjustment of the chaser and clamp for correct position may be made in unison by adjusting screw 26. The elongated slots 23 in the clamp provide sufficient end movement so that in grinding the chasers it is not necessary to grind off any definite amount of the cutting edge in sharpening the chasers. The slots 23 permit sufficient relative movement between the clamp and the holder to allow the chaser to be moved longitudinally in relation to the holder the pitch or distance apart of the grooves 17.

The relation of the cutting edge of the chasers to the center of rotation of the work when cutting thread is determined somewhat by the structure of the metal being threaded. The setting gauge 29 is provided whereby the chasers may be uniformly set in the holders in relation to the center of rotation of the work. The chasers are clamped in fixed operative position by the clamps 18. The grooves 22 engage over the ridges 34 of the grooves 17 on the chaser. The force of the clamping action is directed against the chaser on the surface 16 and on the root surface 35 of clamp grooves 22; however, it is not limited to this surface but can be altered so that the clamping force may be directed against root surfaces 32 of chaser grooves 17 (Figure 11) and crest surface 33 of clamp grooves 22 or by inclining the sides of the grooves similar to the Acme form of thread, the clamping force can be directed against the side angles of the grooves. The construction illustrated permits accurate clamping of the chaser, prevents the chaser from changing its correct cutting position in relation to the holder 21 and provides means for adjusting the chaser to the proper cutting position.

It will be obvious to those skilled in the art that various changes may be made in my device without departing from the spirit of the invention and therefore I do not limit myself to what is shown in the drawing and described in the specification, but only as indicated by the appended claims.

Having thus fully described my said invention, what I claim as new and desire to secure by Letters Patent, is:

1. In a threading die head, a holder block having a recess for chaser, a chaser mounted in said recess, said chaser having thread cutting serrations on its face and having its top provided with a plurality of parallel grooves, a clamp mounted on and secured to said block, said clamp being arranged to clamp the chaser to said block and having grooves adapted to cooperate with the grooves of the chaser, and means for adjusting the clamp and chaser longitudinally of their axes in the block to position said chaser in thread cutting position.

2. In a threading die head, a holder block having a recess for a chaser and a recess for a clamp, a chaser mounted in said first named recess and a clamp mounted in said last named recess, means for holding said clamp in its recess, the chaser having a beveled base, thread cutting serrations on its face, a beveled top and a plurality of grooves cut in its top extending from the face to the back of said chaser and the clamp having a plurality of corresponding ridges adapted to engage the grooves of the chaser, and adjustable means for abutting the clamp to adjust it and secure it against end thrust during a threading operation.

3. In a threading die head, a holder block having a recess, a chaser slidably mounted in said recess, said chaser having a plurality of grooves cut in its top, a substantially U-shaped clamp member having a beveled surface at the end of one leg adapted to slide upon a corresponding surface formed upon said block and having a plurality of grooves on the end of the other leg adapted to mate with the grooves on the top of said chaser to hold the chaser and clamp against relative movement and means engaging said clamp member for adjusting the member and chaser in unison when desired.

4. A threading die head of the type set forth in claim 3, wherein the mating grooves are beveled oppositely.

5. A threading die head comprising a holder block having a recess, a chaser sildably mounted in said recess, said chaser having a plurality of grooves cut in its top, said holder block having a second recess, a substantially U-shaped clamp mounted in said recess comprising a beveled surface on the end of one leg for slidably engaging a corresponding surface in said recess and a grooved surface on the end of said other leg for engaging and mating with the grooves in said chaser, means for fastening said clamp to said holder for limited movement relative thereto and means for moving said clamp and chaser longitudinally in unison to position the chaser in the holder block.

6. A die head as set forth in claim 5 wherein the means for moving comprises a screw threaded through said block and engaging an end of said clamp.

7. In a threading die head, a chaser having a beveled base, a beveled top, thread cutting serrations on its face and a plurality of grooves extending from the face to the back of said chaser; a grooved clamp for clamping said chaser engaging said plurality of grooves; and means for adjusting said chaser and said clamp to set said chaser to correct cutting position in the head independent of the relation of the cutting edge to said grooves on said chaser.

8. A chaser having a face provided with thread cutting serrations, a beveled base portion, and a beveled top portion, one of said portions being provided with parallel grooves extending from the face to the back of said chaser, the bottoms of said grooves being at an angle to said one of the beveled portions.

9. For use with a chaser holder in which a clamp is drawn in a direction substantially parallel to the cutting serrations, a tangential chaser having one face provided with thread cutting serrations, a throat or starting bevel adjoining said serrations, a beveled base portion, a beveled top portion adjoining said starting bevel, said beveled top being provided with parallel grooves extending from said starting bevel to the back of the chaser.

10. In a threading die head, a holder block, a guideway for a chaser formed in said block, a chaser mounted in said block for sliding movement along said guideway in a direction to vary the position of the cutting edge of said chaser, a clamp attached to said block to secure said chaser in position in said guideway, interlocking projections on said clamp and said chaser permitting major adjustment of said chaser with respect to said clamp, and means providing minor adjustment of said clamp and chaser in unison with respect to the guideway of said holder.

11. In a threading die head, a holder block, a guideway for a chaser formed in said block, a chaser mounted in said block for sliding movement along said guideway in a direction to vary the position of the cutting edge of said chaser, means separable from said chaser to clamp the chaser in position in said guideway, means to interlock said clamping means and said chaser together when said chaser has been adjusted to its approximately correct position and retained in said position by said clamping means, and means to adjust said clamping means and chaser in unison with respect to the guideway of said holder whereby the cutting edge of the chaser may be brought to its correct position.

12. In a threading die head, a holder block having a recess for a chaser, a chaser mounted in said recess, said chaser having thread cutting serrations on its face and having a plurality of parallel grooves extending transversely to said serrations, a clamp mounted on and secured to said block, said clamp being arranged to clamp the chaser to said block and having grooves adapted to cooperate with the grooves of the chaser, and means for adjusting the clamp and chaser longitudinally of their axes in the block to position said chaser in thread cutting position.

13. In a threading die head, a holder block having a recess for a chaser and a recess for a clamp, a chaser mounted in said first named recess and a clamp mounted in said last named recess, means for holding said clamp in its recess, the chaser having a beveled base, thread cutting serrations on its face, a beveled top and a plurality of grooves cut in its clamp engaging face, and the clamp having a plurality of corresponding ridges adapted to engage the grooves of the chaser, and adjustable means for abutting the clamp to adjust the clamp and chaser and secure them against end thrust during a threading operation.

14. In a threading die head, a holder block having a recess, a chaser slidably mounted in said recess, said chaser having a plurality of clamping grooves, a substantially U-shaped clamp member having a beveled surface at the end of one leg adapted to slide upon a corresponding surface formed upon said block and having a plurality of grooves on the end of the other leg adapted to mate with the grooves on said chaser to hold the chaser and clamp against relative movement, and means engaging said clamp member for adjusting the member and chaser in unison when desired.

15. A threading die head, comprising a holder block having a recess, a chaser slidably mounted in said recess, said chaser having a plurality of grooves extending from a clamp engaging surface, said holder block having a second recess, a substantially U-shaped clamp mounted in said recess comprising a beveled surface on the end of one leg for slidably engaging a corresponding surface in said recess and a grooved surface on the end of said other leg for engaging and mating with said grooves in said chaser, means for fastening said clamp to said holder for limited movement relative thereto, and means for moving said clamp and chaser longitudinally in unison to position the chaser in the holder block.

16. In a threading die head, a chaser having a beveled base, a beveled top, thread cutting serrations on its face, and a plurality of grooves extending from a clamp engaging surface thereof; a grooved clamp for clamping said chaser engaging said plurality of grooves; and means for longitudinally adjusting said clamp and said chaser in unison to set said chaser to correct cutting position in the head independent of the relation of the cutting edge to said grooves on said chaser.

17. In a threading die head, a holder block, a guideway for a chaser formed in said block, a chaser mounted in said block for sliding movement along said guideway in a direction to vary the position of the cutting edge of said chaser, a clamp guideway in said block, a clamp shiftable along said last named guideway, means to prevent movement of said chaser with respect to said clamp after adjustment of said chaser along said first named guideway, and means to adjust said chaser and clamp as a unit along said guideways.

18. In a threading die head, a holder block, a pair of guideways therein, a chaser and a clamp mounted to slide along said guideways, means to prevent movement of said chaser with respect to said clamp after adjustment of said chaser, and means to adjust said clamp and chaser as a unit along said guideways.

19. In a threading die head, a holder block, a pair of guideways therein, a chaser and a clamp mounted to slide along said guideways, interlocking projections on said clamp and chaser to prevent movement of said chaser with respect to said clamp after adjustment of said chaser, and means to adjust said clamp and chaser as a unit along said guideways.

20. In a threading die head, a holder block, a pair of guideways therein, a chaser and a clamp mounted to slide along said guideways, interlocking projections on said clamp and chaser to prevent movement of said chaser with respect to said clamp after adjustment of said chaser, and a screw threaded in said block to provide a fine adjustment of said clamp and chaser as a unit along said guideways.

21. A chaser as set forth in claim 8, wherein the sides of said grooves lie in planes substantially normal to the longitudinal axis of said chaser.

22. A chaser as set forth in claim 9, wherein said grooves have sides which are substantially normal to the longitudinal axis of said chaser.

23. In a threading die head, the combination set forth in claim 16, wherein said grooves have sides which are substantially normal to the line of movement of said clamp during the longitudinal adjustment thereof.

24. For use in a chaser holder having a longitudinally adjustable grooved clamp; a chaser, comprising, a beveled base, a beveled top and a face provided with thread-cutting serrations; a plurality of grooves formed in a clamp engaging surface of said chaser, said grooves being shaped so as to match with the grooves on the clamp and having their sides substantially normal to the longitudinal axis of said chaser, whereby no substantial forces tending to cause relative movement of the clamp and chaser are developed at said sides during operation.

CHARLES A. REIMSCHISSEL.